(12) United States Patent  
Navarro-Sorroche

(10) Patent No.: US 8,759,748 B2  
(45) Date of Patent: Jun. 24, 2014

(54) NEUTRON GENERATOR AND METHOD OF USE

(75) Inventor: Juan Navarro-Sorroche, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/806,652

(22) PCT Filed: Jan. 31, 2011

(86) PCT No.: PCT/US2011/023186
§ 371 (c)(1),
(2), (4) Date: Dec. 21, 2012

(87) PCT Pub. No.: WO2012/105937
PCT Pub. Date: Aug. 9, 2012

(65) Prior Publication Data
US 2013/0168542 A1   Jul. 4, 2013

(51) Int. Cl.
*G01V 5/00* (2006.01)
(52) U.S. Cl.
USPC ............................................... 250/256
(58) Field of Classification Search
USPC .......... 250/256, 269.1–269.8, 390.01–390.12
See application file for complete search history.

(56) References Cited

U.S. PATENT DOCUMENTS

| | | | |
|---|---|---|---|
| 4,996,017 A | 2/1991 | Ethridge | |
| 5,293,410 A | 3/1994 | Chen et al. | |
| 5,539,788 A | 7/1996 | Ruddy et al. | |
| 2004/0020647 A1 | 2/2004 | Snoga | |
| 2004/0056271 A1 | 3/2004 | Chen et al. | |
| 2009/0135982 A1 | 5/2009 | Groves | |
| 2009/0219028 A1 | 9/2009 | Perkins et al. | |
| 2010/0155589 A1 | 6/2010 | Hall et al. | |
| 2010/0301196 A1* | 12/2010 | Chu et al. | 250/251 |
| 2012/0097532 A1* | 4/2012 | DeLuze | 204/278 |
| 2012/0106690 A1* | 5/2012 | Tang et al. | 376/111 |

OTHER PUBLICATIONS

Persaud et al., "Development of a compact neutron source based on field ionization processes," Mar./Apr. 2011, Journal of Vacuum Science Technology, vol. B, No. 29, pp. 02B107-1 to 02B107-4.*
Gillich et al., "Enhanced pyroelectric crystal D-D nucler fusion using tungsten nanorods," 2009, Nono Today, vol. 4, pp. 227-234.*

* cited by examiner

*Primary Examiner* — Kiho Kim
(74) *Attorney, Agent, or Firm* — W Schmidt

(57) ABSTRACT

A neutron generator comprises a cylindrical housing having a target rod concentrically located along a central axis of the cylindrical housing. An array of field ionization nanotips is positioned around an inner surface of the housing, where the array of nanotips extends toward the central axis. A method for logging a formation comprises deploying a logging tool having a neutron generator into a borehole. An array of nanotips is located around an inner cylindrical surface of a cylindrical housing in the neutron generator are energized. An ionizable gas proximate the array of nanotips is ionized. The ions are accelerated radially inward to bombard a titanium layer on an outer diameter of a target rod concentrically located along a central axis of the cylindrical housing to generate neutrons.

18 Claims, 6 Drawing Sheets

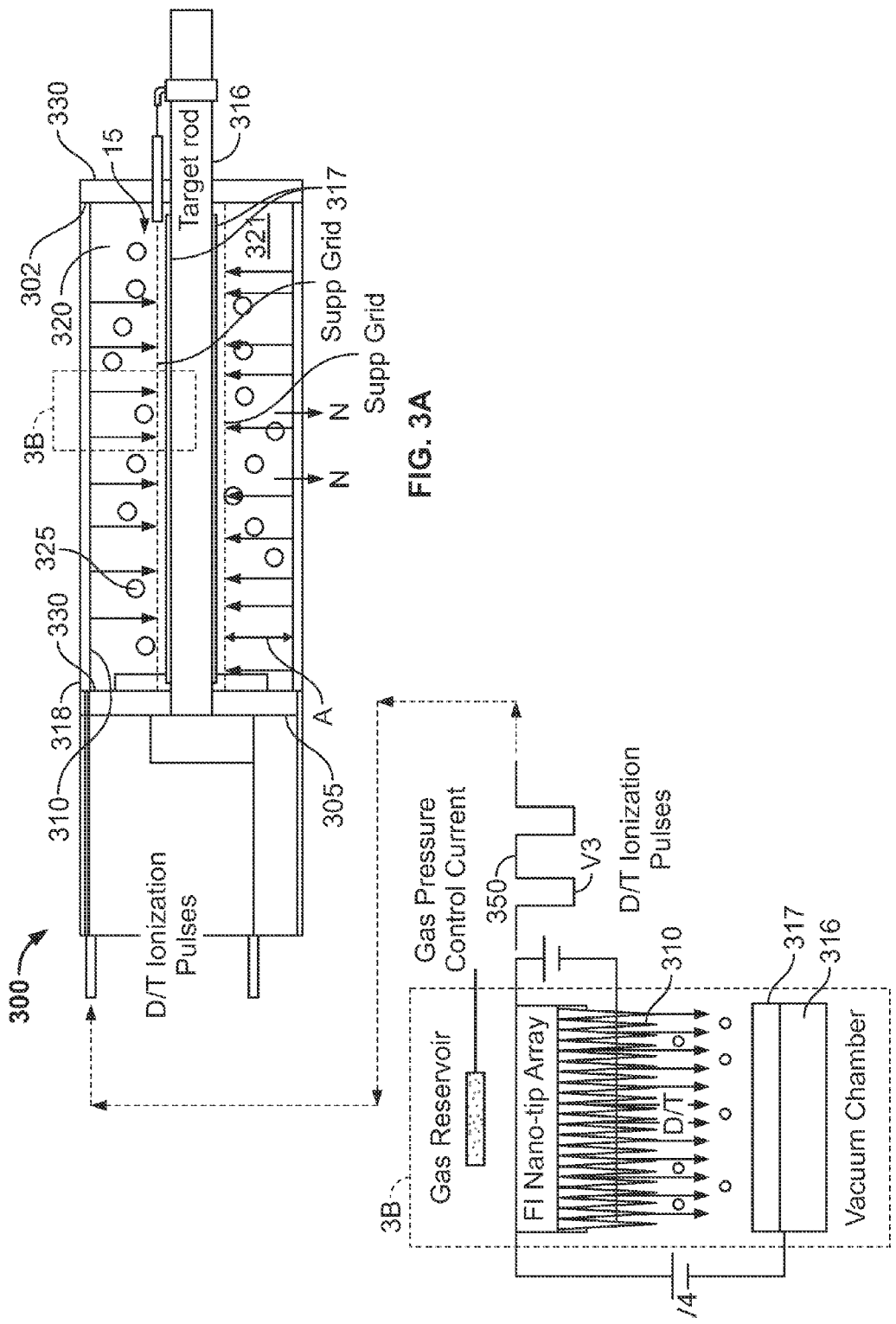

NEUTRON GENERATOR AND METHOD OF USE

BACKGROUND

This application relates generally to the field of neutron generators for well logging.

Neutron well logging instruments are known in the art for evaluation of physical characteristics of subsurface formations penetrated by wellbores. Neutron well logging instruments typically include a source of neutrons having and one or more radiation detectors placed at selected distances from the neutron source. The neutrons from the source enter the formations surrounding the wellbore in which the instrument is disposed. The one or more radiation detectors count radiation events, for example, inelastic gamma rays, epithermal or thermal neutrons, or capture gamma rays. Numbers of such radiation events, and/or their time and energy spectral characteristics, may be related to physical parameters of interest of the surrounding formations.

Neutron sources may comprise a chemical source of neutron emitting radioisotopes or electronic sources emitting either continuous streams of neutrons or controlled duration bursts of neutrons.

BRIEF DESCRIPTION OF THE DRAWINGS

A better understanding of the present invention can be obtained when the following detailed description of example embodiments are considered in conjunction with the following drawings, in which:

FIGS. 3A and 3B show another example embodiment of a neutron generator;

DETAILED DESCRIPTION

The embodiments are described herein merely as examples of useful applications of the principles of the invention, which is not limited to any specific details of these embodiments.

Figure 1:
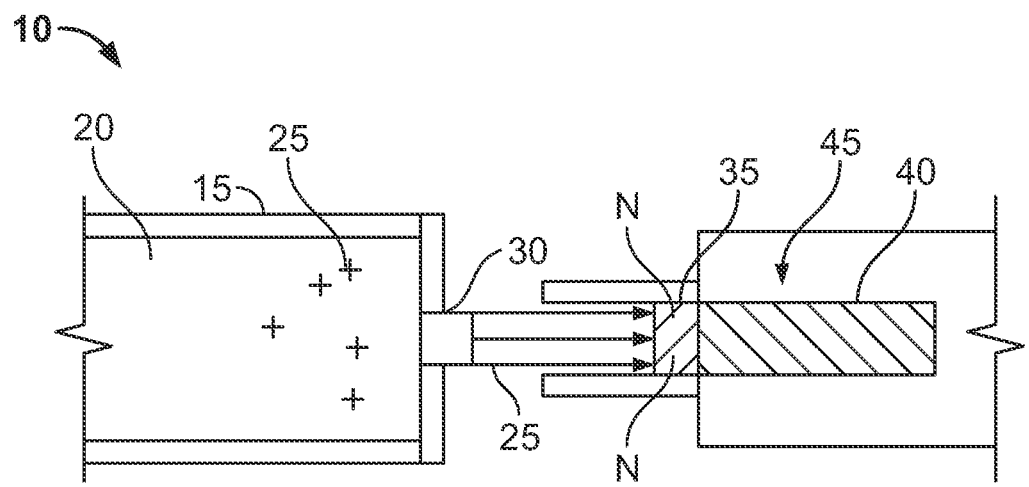
FIG. 1 shows a schematic view of a prior art neutron generator.

FIG. 1 depicts one example of part of a prior art neutron generator (NG) 10. The ion source section 15 comprises an ionizable gas 20, for example deuterium, tritium, and combinations thereof. A high voltage pulse applied between an anode and cathode (both not shown) creates an arc discharge needed for initiating the ionization of gas 20 in the source. Such ion sources are known to produce mostly a mixture of predominantly diatomic and triatomic molecular ions 25, for example deuterium (D) and tritium (T) ions. In some prior art sources, operation primarily depends on a) gas equilibrium pressure, b) anode-cathode voltage, and c) magnetic field intensity B. A uniform magnetic field may be required across the ion source for the ion source to properly operate. The alternative use of a solenoid requires providing electrical connections to the tube, as well as the associated circuitry to supply the solenoid's current. Either concept adds to the mass, volume, and complexity of the ion source. A target rod 45 of conventional design may comprise a copper rod 40 of less than half inch in diameter. The axially distributed geometry of source 10 limits the surface area of the target to the area of the rod's sectional area facing the extraction aperture 30. The relatively small target surface area of such conventional NGs increases the thickness of a titanium layer 35 deposited in the face cross sectional area of the target rod. The ions escape through aperture 30 and are accelerated toward target 45. The ions impact deuterium and/or tritium atoms in the target titanium layer 35 and eject neutrons N into the surrounding formation. Because of the large difference in thermal conductivity of titanium $\kappa=21.9$ W/mK° relative to the thermal conductivity of copper $\kappa=401$ w/mK°, of the rod, the thicker the titanium layer deposited on the target face, the higher the temperature increase due to deuterium and tritium ion bombardment during the tube's operation. The titanium layer on the target rod can therefore reach temperatures in excess of 250° C., at which point titanium starts desorbing the implanted deuterium and tritium, thus substantially lowering the neutron yield.

In at least one example, the present disclosure describes a neutron generator comprising a cylindrical field ionization (FI) array disposed on an inner diameter and a concentric target section providing a substantial increase in available target surface area. Field ionization may be considered as field emission with reversed polarity, as the principles governing field emission applies to field ionization with the polarity of the electric field inverted. Field ionization occurs when a gas molecule approaching the metal surface is ionized by electron tunneling from the gas atom to the metal. Field emission arrays can be used as field ionization (FI) arrays by simply reversing the polarity of the electric potential.

Figure 2A:
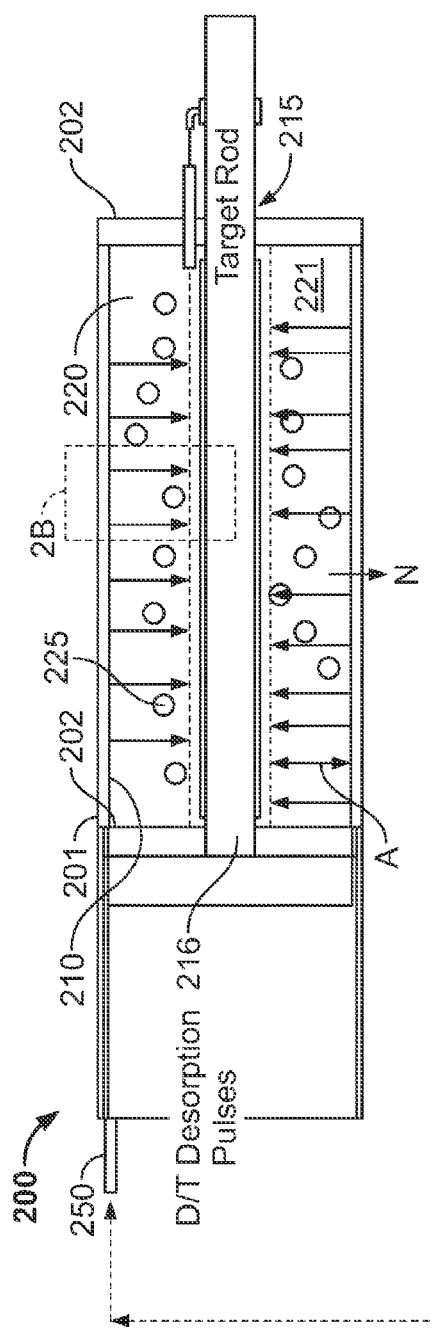
FIGS. 2A and 2B show one example embodiment of a neutron generator.
Figure 2B:
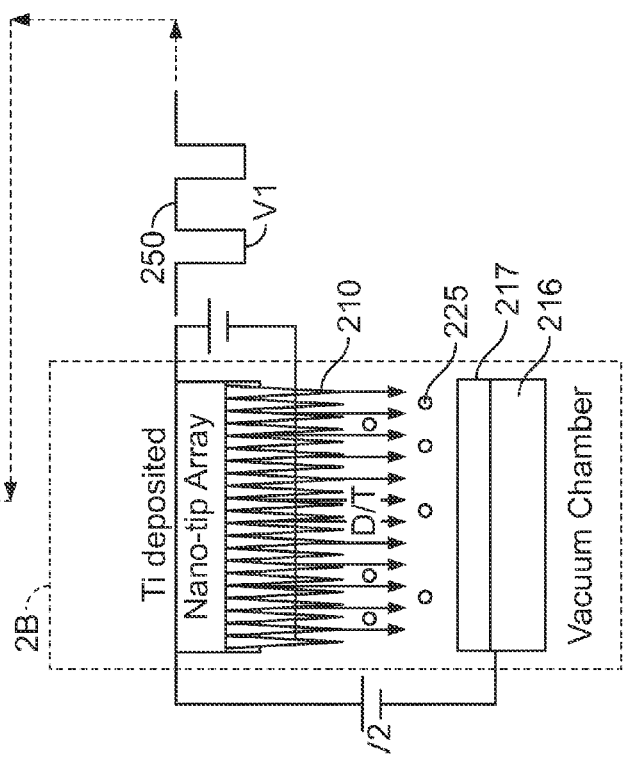

FIGS. 2A and 2B show a block diagram of one embodiment of an NG 200. NG 200 may comprise a cylindrical housing 201, insulator bulkheads, and an electrostatic field desorption (EFD) nanotip array 210 where the creation of predominantly monatomic D and T ions 225 takes place. In one embodiment, EFD nanotip array 210 is cylindrical and is attached to the inner diameter of housing 201. NG 200 may also comprise a target 215 having a target rod 216 and a titanium layer 217 having absorbed D and T atoms. In one example, target rod 216 may be made of copper. In one embodiment, EFD nanotip array 210 may comprise tungsten nanotips, carbon nanotubes (CNT), and combinations thereof. Alternatively, EFD nanotip array 210 may be made of carbon nanotips. Target rod 216 is positioned concentrically inside at least a portion of EFD nanotip array 210 creating an annular cavity 221.

During operation, a high voltage V2 of approximately −100 kV may be applied between target 215 and the EFD nanotip array 210. EFD nanotip array 210 is pulsed with negative voltage V1 pulses 250 of approximately 1 kV at a predetermined repetition rate. In one example, the turn-on/turn-off time is no greater than about 1 microsecond. Voltage V1 applied to EFD array 210 creates the large electric field between the nanotips and an ionizable gas 220, for example a D/T mixture, at a vacuum pressure of the order of 1 mTorr. The ions generated are accelerated to impact the target 215. In one example, target rod 216 has a titanium layer 217, of about 5000 to about 14500 angstroms thickness, deposited on the outer surface of rod 216 using techniques known in the art. Predominantly monatomic D and T ions are deposited in titanium layer 217 in a process known in the art as target loading. The predominantly monatomic D and T ions 225 are accelerated from the EFD nanotip array 210 and bombard the D/T impregnated target layer 217 resulting in the creation of energetic neutrons by the known D+T=He+N+14.6 Mev reaction. The neutrons escape substantially radially from titanium layer 217 towards the surrounding environment which may be a subsurface formation. In one embodiment, housing 201 may have an outer diameter on the order of 1.25-1.5 inches. In one example, the distance A from the EFD array 210 to the target 215 may be on the order of 0.325-0.500 inches.

FIGS. 3A and 3B show an example schematic diagram of an NG 300 comprising a cylindrical housing 318 having a cylindrical field ionization (FI) nanotip array 310 disposed on an inner diameter thereof. The cylindrical FI nanotip array 310 may be physically attached to the inner diameter of housing 318. Alternatively, FI nanotip array 310 may be a self-supporting item insertable into housing 318. In one example, FI nanotip array 310 comprises tungsten nanotips. Alternatively, FI nanotip array 310 may comprise carbon nanotubes. Target rod 316 is positioned concentrically inside at least a portion of FI nanotip array 310 creating an annular cavity 321. In one example, target rod 316 has a titanium layer 317, of about 5000 to about 14500 angstroms thickness, deposited on the outer surface of rod 316 using techniques known in the art. Predominantly monatomic D and T ions are deposited in titanium layer 317 in a process known in the art as target loading. A secondary electron suppressor grid 319 is placed concentrically around rod 316 between nanotip array 310 and rod 316. Electrical insulating bulkheads 330 isolate the high voltage between nanotip array 310 and rod 316. An ionizable gas 320 is introduced into cavity 321 through gas header 305. Ionizable gas 320 may comprise D, T, and combinations thereof. In operation, predominately monatomic D and T ions 325 are accelerated from the FI nanotip array 310 and bombard the D/T impregnated target layer 317 resulting in the creation of energetic neutrons, N, as described above. The neutrons escape substantially radially from titanium layer 317 towards the surrounding environment which may be a subsurface formation. In one embodiment, housing 301 may have an outer diameter on the order of 1.25-1.5 inches. In one example, the distance A from FI array 310 to the target 315 may be on the order of 0.325-0.500 inches.

Figure 4A:
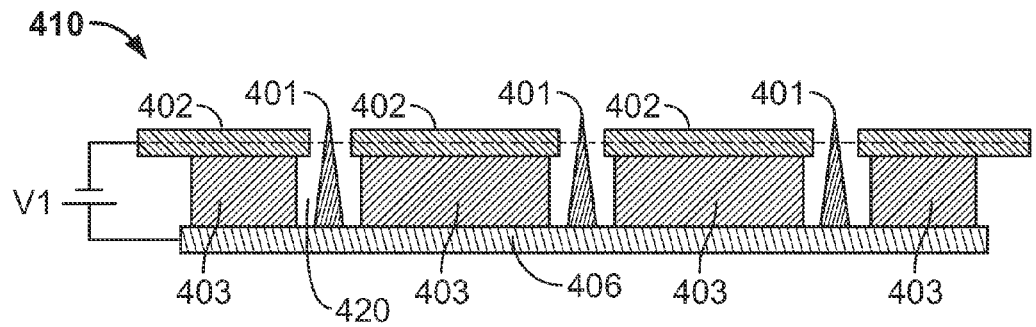
FIGS. 4A, 4B, and 4C show examples of field ionization nanotip arrays.
Figure 4B:
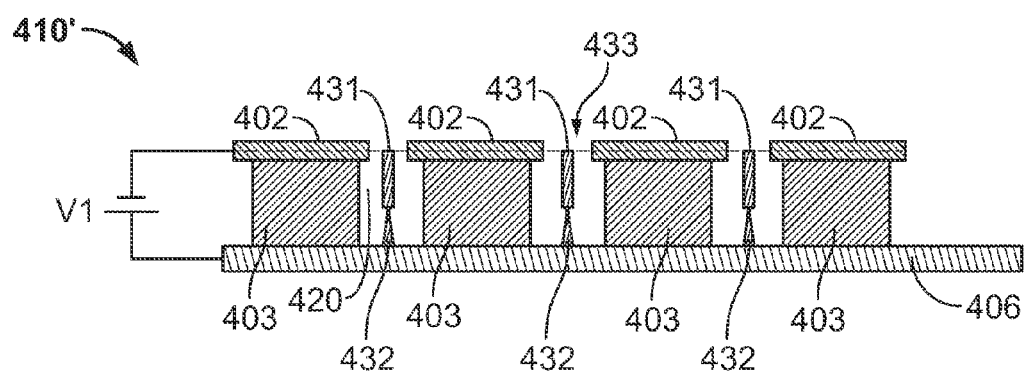
Figure 4C:
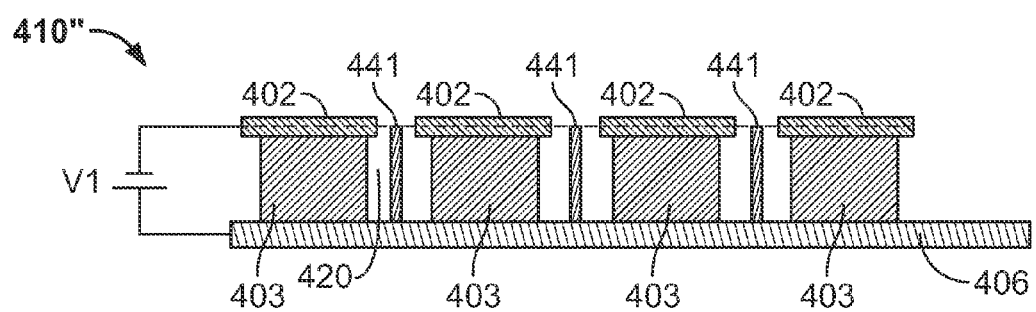

Examples of a nanotip array 410 are depicted in FIGS. 4A-4C. In one example, see FIG. 4A, FI nanotip array 410 comprises a plurality of spaced apart nanotips 401 attached to substrate 406. In one example, nanotips 401 may be made of tungsten. Alternatively, nanotips 401 may be made of carbon. In one example, substrate 406 may be a nickel based material. In one example, nanotip array 410 may be formed in a cylindrical shape with nanotips 401 directed toward a central axis 450 of the cylinder. Interspaced between nanotips 401 are gate electrodes 402 spaced and isolated from substrate 406 by insulators 403. An ionizable gas 420, for example a D/T mixture at an adjustable vacuum pressure is present in the area of nanotips 401. The spacing between nanotips 401 and gate electrodes 402 is selected such that pulses of ionization voltage V1 between gate electrodes 402 and nanotips 401 act to generate ions from gas 420. In another alternative, nanotip array 410 may be formed in several lengthwise strips that are attached around the inside surface of a cylindrical housing such that the lengthwise dimension of the strip is parallel with the axis of the cylindrical housing, and the nanotips extend toward a central axis of the housing. FIG. 4B shows one alternative example of a nanotip 433 for use in nanotip array 410'. Nanotip 433 may comprise a tungsten base tip 432 attached to substrate 406 and a carbon nanotip 431 molecularly formed on the end of tungsten nanotip 432 using techniques known in the art. FIG. 4C show yet another alternative example of a nanotip 441 for use in nanotip array 410". Nanotip 441 may comprise a carbon nanotube attached to substrate 406.

The emission surface area of the present concentric NG is substantially larger than the emission surface area of conventional designs using end targets. For example, assuming that the target rod diameter of the present concept and the target diameter of the conventional target are D, and the length of the target in the present concept is L, then it can be shown that the ratio of emission areas of the new target to the conventional target is R=4*L/D. Assuming a target rod length of 3 inches and a target rod diameter of 0.5 inches, the ratio R=24. Clearly, a substantial increase in emission area, and neutron emission, can be realized with the concepts of the present disclosure. In addition, the cylindrical distribution of the FI nanotips around the inner surface of the housing, results in a similar increase in ion generation. As indicated above, the titanium layer thickness on a conventional target may induce thermal stress and D/T desorption issues. The substantial increase in emission area of the present disclosure allows a thinner titanium layer to be used. By reducing the thickness of the titanium layer deposited on the cylindrical surface of the target rod, thermal conduction between the titanium layer and the copper rod can significantly be increased, therefore lowering the maximum temperature the titanium layer reaches during operation, and reducing desorption of the impregnated D/T atoms in the layer. The reduced heating of the titanium layer provides the ability to increase the duty cycle of the emission such that turn-on/turn-off times of about 1 microsecond, or less may be achieved.

Neutron yield of conventional neutron generator tubes is mainly limited by: a) ion extraction efficiency, b) ion beam coverage of target surface area, c) power dissipation of the target rod and d) thermal desorption of D/T at the Ti layer. By using the cylindrical surface of the target rod as the target, a substantially higher surface area is provided for the D/T fusion reaction to take place. In addition, by reducing the thickness of the Ti layer around the target's surface, neutron yield reducing thermal desorption of D/T is drastically reduced.

Field Ionization Theory

Field ionization is also considered as field emission with reversed polarity, as the principles governing field emission applies to field ionization with the polarity of the electric field inverted. The theory of field emission dates from the 1928 work by Nordheim, further developed during the past four decades. It is usually described by the Fowler-Nordheim equation that in its simplest form can be written as $$j = A * F^2 e^{-\frac{B\phi^2}{F}} \qquad 1$$

where j is the current density, A is a function of the surface potential φ, B is a constant and F is the applied electric field. Field emission occurs when an electron from a metal tunnels through the potential barrier between the metal's surface and vacuum, the surface potential. In field emission a positive potential in applied between vacuum and surface. A view of the electron tunneling process can be obtained by applying basic principles to the metal-vacuum interface.

Consider the potential energy diagram for an electron in a metal as depicted in FIG. 5. With no electric field applied (FIG. 5a), for an electron to escape from the surface of the metal it must have an energy in excess of the surface potential φ. The potential barrier for the electron extends from the surface of the metal to ∞ in the x direction. The application of an electric field of intensity F alters the potential energy by −xFe as shown by the straight line in the FIG. 5b. Electrons now have a lower potential barrier of height ($\mu+\phi-E_x$) and width $$\frac{\phi+\mu-E_x}{Fe},$$

where $\phi$, $\mu$, $E_x$ and e are the surface potential, Fermi level, electron energy and electron charge respectively. It is because the width of the barrier is now finite for F<0 that exists a finite probability for the electron to tunnel across the barrier. From energy and momentum conservation consideration using the Heisenberg relation $\Delta p \Delta x \geq \hbar$ $$\Delta p \geq \frac{\hbar}{w} = \frac{\hbar}{\frac{\phi}{eF}} \qquad 2$$

where the width of the barrier w has been used as the uncertainty in the x direction, and the energy of the most energetic electrons has been assumed to be close to the Fermi level $E_x \sim \mu$. Associated with the uncertainty $\Delta p$ the total energy of the electron can now be approximated to first order by $$E_e = \frac{(p+\Delta p)^2}{2m} = \frac{p^2 + 2p\Delta p}{2m} \qquad 3$$

for $\Delta p \ll p$

Equation 3 can be further simplified by writing $$E_e = \frac{p^2 + 2p\Delta p}{2m} = \mu + \sqrt{\frac{2\mu}{m}}\frac{\hbar}{w} \qquad 4$$

where $$\frac{p^2}{2m} = \mu$$

has been used.

Then the change in electron's energy corresponding to the uncertainty $\Delta p$ can be written as $$\Delta E_e = \sqrt{\frac{2\mu}{m}}\frac{\hbar}{w} \qquad 5$$

An electron with energy of the order of the surface potential $\Delta E_e = \phi$ is almost certain to tunnel across the barrier, therefore rearranging equation 5 gives $$w = \sqrt{\frac{2\mu}{m}}\frac{\hbar}{\phi} \qquad 6$$

Using typical values for the Fermi $\mu=10$ eV and surface potential $\phi=4.5$ eV of typical metals such as tungsten, a magnitude for the electric field $$F = \frac{\phi}{ew} = 1.5 \frac{V}{\text{Å}} \qquad 7$$

can be obtained. Equation 7 indicates that significant tunneling occurs at values of the applied electric field of the order of 1 volt per Angstrom.

Figure 5A:
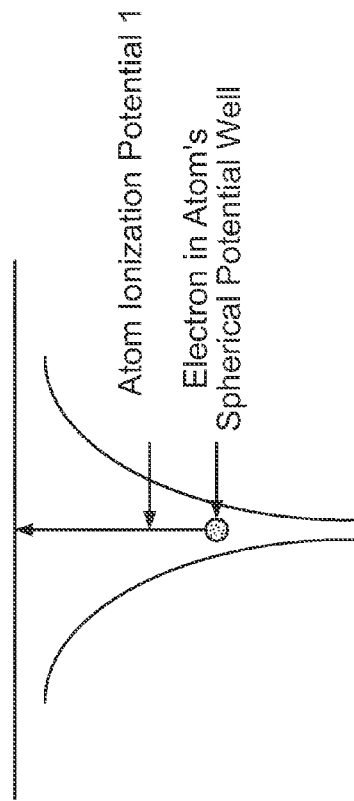
FIGS. 5a-d show potential energy diagrams for an electron in a metal.
Figure 5B:
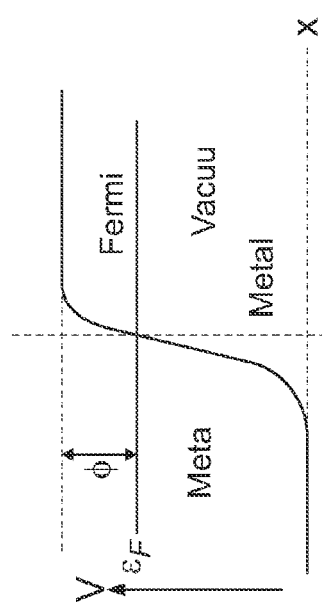
Figure 5C:
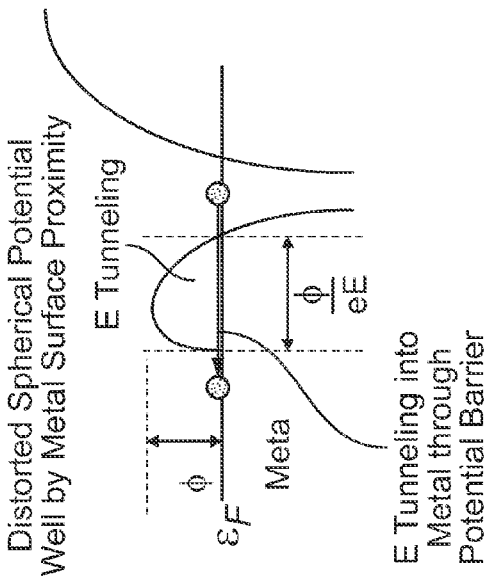
Figure 5D:
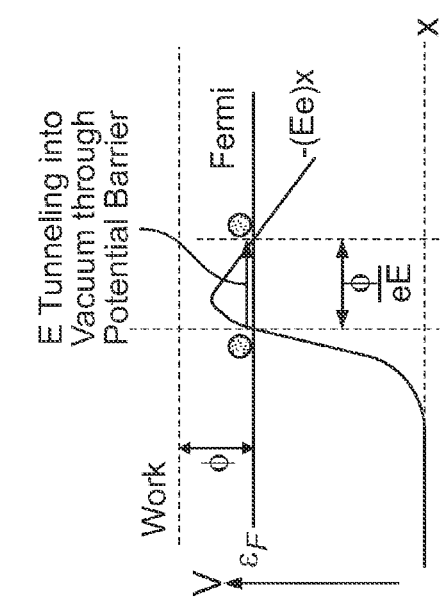

FIG. 5c and FIG. 5d show an energy diagram for electrons in the spherical potential of an atom far away and at close proximity of a metal tip. Electrons in the spherical potential well with certain energy levels can tunnel through the potential barrier into the metal tip as shown in FIG. 5d. Pauli's exclusion principle prevents electron with energies lower to the Fermi energy to tunnel to the tip since there is no empty states in the metal below the Fermi level. For a particular electric field intensity F there is a critical distance for the gas atom to be ionized.

$$x_c = \frac{(I-\phi)}{F} \qquad 8$$

Following Gomer [1] and Muller [2], the ion current supplied by the array can be derived by extending the ideal supply function of an ideal gas, $$n = \frac{P}{\sqrt{2\pi mkT}} \qquad 9$$

to the surface of a sphere of radius r around the tip of radius $r_t$ $$n_0 = \frac{P}{\sqrt{2\pi mkT}} 4\pi r^2 \qquad 10$$

and using the expression for the energy of a molecule in the electric field $\vec{F}$ created by the tip $$\frac{1}{2}mv^2 = \frac{1}{2}\alpha F^2 + \varepsilon F - \frac{l^2}{2mr^2} \qquad 11$$

that at the point of closest approach can be used to write for v $$v = \sqrt{\frac{2}{m}\left(\frac{1}{2}\alpha F^2 + \varepsilon F + \frac{l^2}{m^2 r_t^2}\right)} = 0 \Rightarrow \frac{1}{2}\alpha F^2 + \varepsilon F - \frac{m^2 v^2 r^2}{2mr_t^2} = \qquad 12$$

$$0 \Rightarrow \frac{r^2}{r_t^2} = \frac{\frac{1}{2}\alpha F^2 + \varepsilon F}{kT} \Rightarrow r^2 = \frac{\frac{1}{2}\alpha F^2 + \varepsilon F}{kT} r_t^2 = \frac{\alpha F^2}{2kT}$$

where ½ $mv^2=kT$ has been used, for the zero dipole moment $\varepsilon=0$.

Using equation 12, the supply function can now be written $$i = n_0 q = 4\pi r_t^2 \frac{\alpha F^2}{2kT} \frac{P}{\sqrt{2\pi mkT}} q \qquad 13$$

or

-continued $$i = n_0 q = 2\pi\alpha \frac{V_t^2}{kT} \frac{P}{\sqrt{2\pi mkT}} q \qquad 14$$

Equation 14 indicates the emitter ionization current is dependent on the gas pressure and the square of the tip's electric potential.

Figure 6:
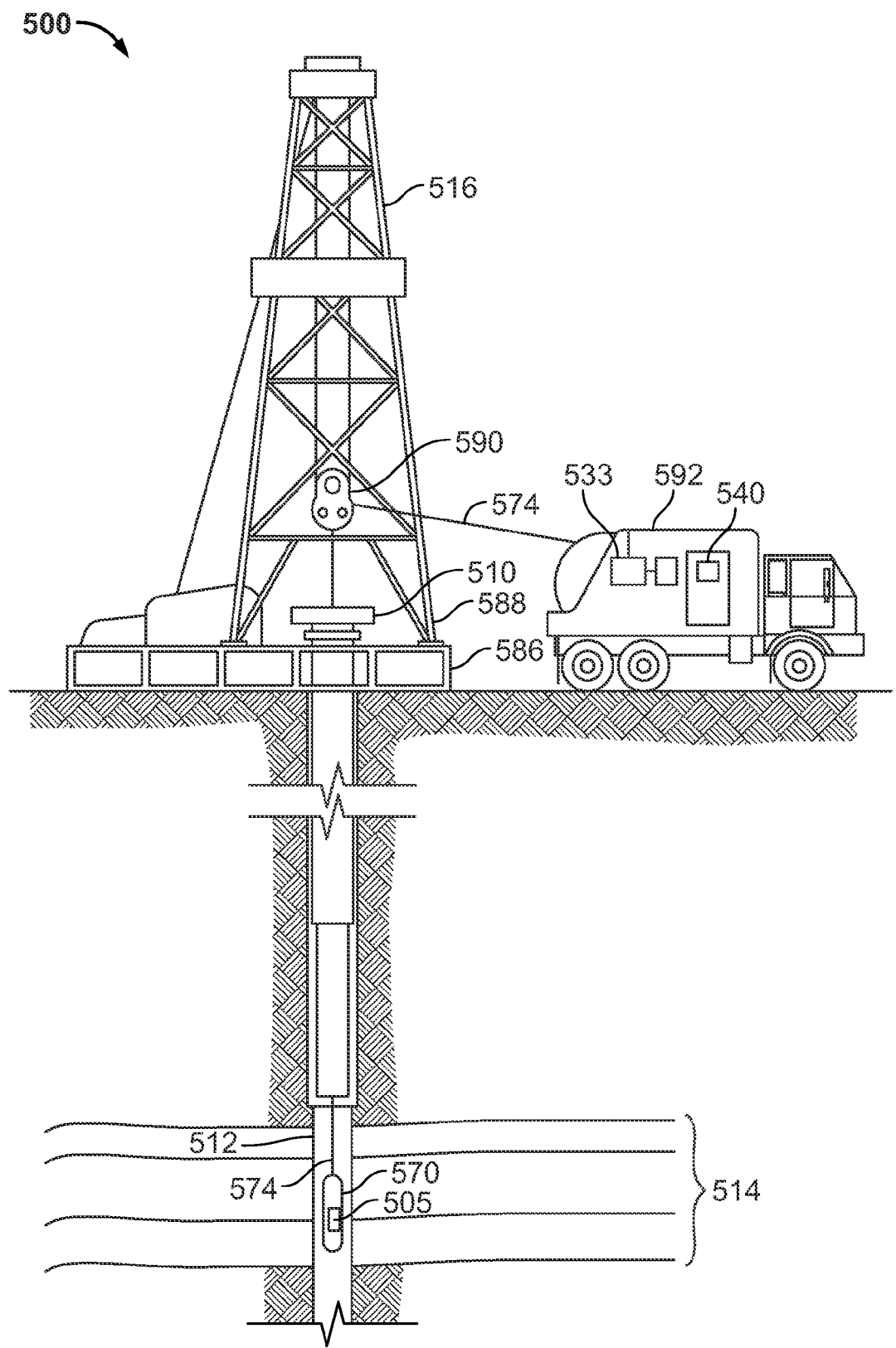
FIG. 6 illustrates an example of a wireline logging system.

FIG. 6 illustrates an example of a wireline logging system 500. A derrick 516 supports a pulley 590. Drilling of oil and gas wells is commonly carried out by a string of drill pipes connected together so as to form a drilling string that is lowered through a rotary table 510 into a wellbore or borehole 512. Here it is assumed that the drilling string has been temporarily removed from the borehole 512 to allow a wireline logging tool 570, such as a probe or sonde, to be lowered by wireline or logging cable 574 into the borehole 512. The wireline logging cable 574 may have one or more electrical and/or optical conductors for communicating power and signals between the surface and the logging tool 570. Typically, the tool 570 is lowered to the bottom of the region of interest and subsequently pulled upward. During the upward trip, sensors 505 located in the tool 570 may be used to perform measurements on the subsurface formations 514 adjacent the borehole 512 as they pass by. Measurements may comprise downhole pressure, downhole temperature, the resistivity or conductivity of the drilling mud and earth formations, the density and porosity of the earth formations, as well as the orientation of the wellbore. Sensor examples include, but are not limited to: a resistivity sensor, a porosity sensor, a nuclear density sensor, a magnetic resonance sensor, and a directional sensor package. In addition, formation fluid samples and/or core samples may be extracted from the formation using formation tester. Such sensors and tools are known to those skilled in the art. While described herein as a wireline logging operation, it will be understood by those skilled in the art that similar measurements may be made during drilling, completion, and production operations. Such sensors may be deployed using coiled tubing, drill pipe, and prewired drill pipe. In one example, at least one embodiment of a neutron generator 505 disclosed herein may be deployed downhole to determine formation parameters comprising density and porosity.

The measurement data can be communicated to a surface processor 533 in logging unit 592 for storage, processing, and analysis. The logging facility 592 may be provided with electronic equipment for various types of signal processing. Similar log data may be gathered and analyzed during drilling operations (e.g., during Logging While Drilling, or LWD operations). The log data may also be displayed at the rig site for use in the drilling and/or completion operation on display 540.

NOMENCLATURE

A $1^{st}$ Fowler-Nordheim constant
B $2^{nd}$ Fowler-Nordheim constant
F Electric field intensity
I Electron ionization energy
P Gas pressure
T Temperature in Kelvin
V Voltage
α Molecular polarizability
ε Electric dipole moment
φ Surface potential
μ Fermi energy
ℏ Planck's constant divided by 2Pi
i Current density
k Boltzman constant
m Mass of particle
p Linear momentum
Δp Momentum uncertainty
q electric charge

The invention claimed is:

1. A neutron generator comprising:
   a cylindrical housing;
   a target rod concentrically located along a central axis of the cylindrical housing; and
   an array of field ionization nanotips positioned around an inner surface of the housing, said array of nanotips extended toward the central axis.

2. The neutron generator of claim 1 further comprising a titanium layer deposited on an outer diameter surface of the target rod.

3. The neutron generator of claim 2 wherein the titanium layer is loaded with predominately monatomic deuterium and tritium atoms.

4. The neutron generator of claim 2 wherein the titanium layer comprises a thickness of about 5000 to about 15000 angstroms.

5. The neutron generator of claim 1 further comprising an ionizable gas proximate the plurality of nanotips.

6. The neutron generator of claim 5 wherein the ionizable gas comprises at least one of: a deuterium gas, a tritium gas, and a combination thereof.

7. The neutron generator of claim 6 wherein the turn-on/turn-off time is no greater than about 1 microsecond.

8. The neutron generator of claim 1 wherein the nanotips comprise at least one of: a tungsten material, a carbon material, and a combination thereof.

9. A method for generating neutrons comprising:
   concentrically locating a target rod along a central axis inside a cylindrical housing; and
   positioning an array of field ionization nanotips around an inner surface of the housing such that the array of nanotips extend toward the central axis.

10. The method of claim 9 further comprising depositing a titanium layer on an outer diameter of the target rod.

11. The method of claim 10 further comprising loading the titanium layer with predominately monatomic deuterium and tritium atoms.

12. The method of claim 11 further comprising energizing the array of nanotips to ionize an ionizable gas proximate the array of nanotips, and accelerating the ions to bombard the titanium layer thereby generating neutrons.

13. The method of claim 12 wherein the ionizable gas comprises at least one of: a deuterium gas, a tritium gas, and a combination thereof.

14. The method of claim 9 further comprising forming the nanotip array from at least one of: a tungsten material, a carbon material, and a combination thereof.

15. A method for logging a formation comprising:
   deploying a logging tool having a neutron generator into a borehole;
   energizing an array of nanotips located around an inner cylindrical surface of a cylindrical housing in the neutron generator;
   ionizing an ionizable gas proximate the array of nanotips; and
   accelerating the ions radially inward to bombard a titanium layer on an outer diameter of a target rod concentrically located along a central axis of the cylindrical housing to generate neutrons.

16. The method of claim 15 further comprising loading the titanium layer with predominately monatomic deuterium and tritium atoms.

17. The method of claim 15 wherein the ionizable gas comprises at least one of: a deuterium gas, a tritium gas, and a combination thereof.

18. The method of claim 15 further comprising forming the nanotip array from at least one of: a tungsten material, a carbon material, and a combination thereof.

* * * * *